United States Patent [19]

De Antonio et al.

[11] Patent Number: 5,205,029
[45] Date of Patent: Apr. 27, 1993

[54] METHOD OF MANUFACTURING A FREQUENCY ADAPTER

[75] Inventors: Richard De Antonio, Courcouronnes; Didier Lacarriere, Chalon St Mars, both of France

[73] Assignee: Vibrachoc, Evry Cedex, France

[21] Appl. No.: 836,561

[22] Filed: Feb. 18, 1992

[30] Foreign Application Priority Data

Feb. 19, 1991 [FR] France ............... 91 01941

[51] Int. Cl.$^5$ .............................. B29C 45/14
[52] U.S. Cl. ............................ 29/436; 29/516; 29/898.055; 264/249; 264/262
[58] Field of Search ............... 264/262, 249; 29/898.055, 516, 436

[56] References Cited

U.S. PATENT DOCUMENTS

| | | | |
|---|---|---|---|
| 1,983,796 | 12/1934 | Geyer | 29/898.055 |
| 3,199,186 | 8/1965 | Simpson | 29/898.055 |
| 3,703,761 | 11/1972 | Van Winsen et al. | 29/436 |
| 3,754,317 | 8/1973 | Taylor | 264/262 |
| 3,822,464 | 7/1974 | Hester et al. | 29/516 |
| 4,018,462 | 4/1977 | Saka | 29/516 |
| 4,385,025 | 5/1983 | Salerno et al. | 264/262 |
| 5,085,289 | 2/1992 | Chance | 264/262 |

FOREIGN PATENT DOCUMENTS 7327342 1/1974 Fed. Rep. of Germany .
732456 6/1955 United Kingdom .

OTHER PUBLICATIONS

Patent Abstracts of Japan, vol. 14, No. 388 (M-1014)(4331), Aug. 22, 1990 & JP-A-2 146 328 (Toyoda Gosei Co. Ltd), Jun. 5, 1990.
Patent Abstracts of Japan, vol. 12, No. 432 (M-763)(3279), Nov. 15, 1988 & JP-A-63 163 043 (Bridgestone Corp.), Jul. 6, 1988.

Primary Examiner—Jan H. Silbaugh
Assistant Examiner—Brian J. Eastley
Attorney, Agent, or Firm—Sughrue, Mion, Zinn, Macpeak & Seas

[57] ABSTRACT

Method of manufacturing a cylindrical type frequency adapter including at least one assembly in the form of an elastomer ring molded between and adhering to an inner armature and a cylindrical ring wherein the assembly or each of the assemblies is sleeved into an outer sheath. After the elastomer ring is molded between the inner armature and the cylindrical ring and the resulting assembly is cooled, without carrying out any diameter reducing operations, the assembly is sleeved into the outer sheath after which the diameter of the complete adapter is reduced by plastic deformation of the outer sheath which also reduces the diameter of the cylindrical ring.

1 Claim, 1 Drawing Sheet

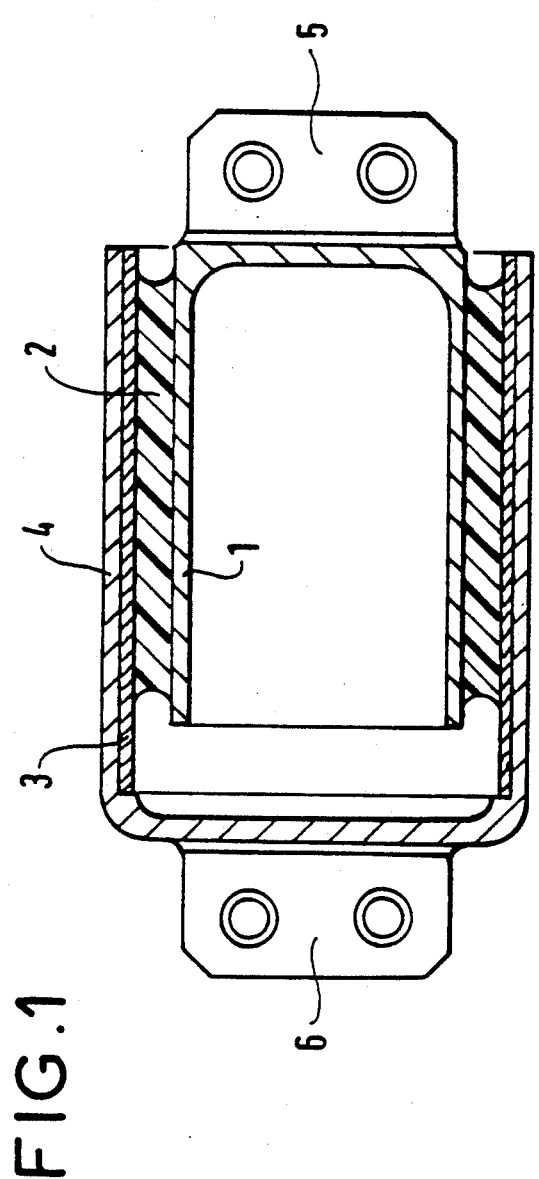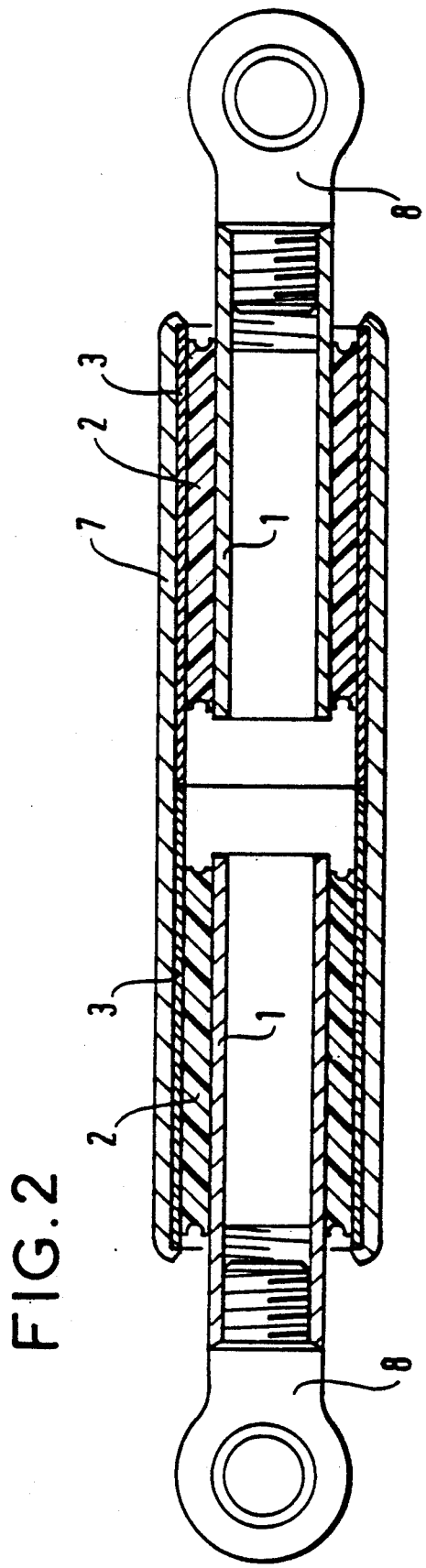

METHOD OF MANUFACTURING A FREQUENCY ADAPTER

BACKGROUND OF THE INVENTION

1. Field of the Invention

The present invention concerns a method of manufacturing a frequency adapter. A frequency adapter is a device which filters and damps vibration. The frequency adapter is inserted between two parts one of which is subject to or the source of vibrations.

2. Description of the Prior Art

The invention applies to a frequency adapter of the cylindrical kind comprising at least one assembly formed by an elastomer ring molded between an inner armature and a cylindrical ring, said elastomer ring adhering to the armature and to the cylindrical ring, said assembly or assemblies being sleeved into an external sheath.

If the adapter comprises a single such assembly one of the parts between which it is inserted is fixed to the inner armature and the other to the outer sheath. However, the adapter may comprise two aligned assemblies and in this case one of the parts is fixed to the inner armature of one assembly and the other to the inner armature of the other assembly. The outer sheath is then used to join the two assemblies together.

When an assembly of this kind cools after the elastomer ring is molded the resulting shrinkage causes residual stresses in the elastomer ring. These stresses must be eliminated to prevent breakdown of adhesion and because they reduce the service life of the adapter because of increased fatigue. A known way to eliminate these stresses is to reduce the diameter of the component using a known tool. This operation involves deformation beyond the elastic limit, i.e. plastic deformation. However, during this operation the cylindrical ring whose diameter is reduced is deformed and is no longer perfectly circular. It is therefore necessary to machine the assembly after the reduction in diameter in order to make it circular and to achieve the required final dimension before it is sleeved into the outer sheath.

An object of the present invention is to avoid such machining and to simplify the operation of sleeving the assembly into the outer sheath.

SUMMARY OF THE INVENTION

The invention consists in a method of manufacturing a cylindrical type frequency adapter comprising at least one assembly in the form of an elastomer ring molded between an inner armature and a cylindrical ring, said elastomer ring adhering to said armature and to said cylindrical ring, wherein said assembly or each of said assemblies is sleeved into an outer sheath and after said elastomer ring is molded between said inner armature and said cylindrical ring and the resulting assembly is cooled, without carrying out any diameter reducing operations, said assembly is sleeved into said outer sheath after which the diameter of the complete adapter is reduced by plastic deformation of said outer sheath which also reduces the diameter of said cylindrical ring.

The invention will now be described with reference to the appended drawings.

BRIEF DESCRIPTION OF THE DRAWINGS

FIG. 1 shows a frequency adapter that can be manufactured by the method in accordance with the invention.

FIG. 2 shows another embodiment of frequency adapter to which the method in accordance with the invention can be applied.

DETAILED DESCRIPTION OF THE INVENTION

Referring to FIG. 1, a frequency adapter comprises an inner armature 1, an elastomer ring 2 surrounding the armature 1, a cylindrical ring 3 around the elastomer ring 2 and finally, covering all these, an outer cylindrical sheath 4.

The adapter is fixed between two parts one of which is subject to or is the source of vibrations. One of the two parts is fixed to the inner armature 1 which incorporates a fixing lug 5 and the other part is fixed to the outer sheath 4 which incorporates a fixing lug 6.

When the adapter is manufactured the elastomer 2 is molded at raised temperature and under pressure, using a conventional process, between the inner armature 1 and the cylindrical ring 3. Before this molding the inner armature 1 and the cylindrical ring 3 are conventionally coated with an agent promoting strong adhesion of the elastomer to the armature 1 and to the ring 3 during molding.

After the resulting assembly is cooled, it is loosely sleeved into the outer sheath 4, i.e. without clamping. On completion of this sleeving and to eliminate residual stresses in the elastomer ring 2 generated during cooling after molding the diameter of the adapter assembly is reduced by plastic deformation of the outer sheath to reduce its diameter and that of the cylindrical ring 3 which releases the stresses in the elastomer ring.

The deformation of the cylindrical ring 3 is necessarily an elastic deformation and its diameter is maintained by the outer sheath which itself is subject to plastic deformation.

The diameter reducing operation simultaneously and in a simple manner clamps the outer sheath onto the assembly comprising the cylindrical ring 3, the elastomer ring 2 and the inner armature 1.

Thus, by reducing the diameter of the complete assembly in the outer sheath rather than directly, the invention avoids the need to machine the assembly. Furthermore, the clamping of the outer sheath to the assembly is achieved at the same time so that the assembly can be mounted in the outer sheath with a loose fit or even with slight clearance.

When the diameter of the complete adapter has been reduced it is not necessary to carry out any machining because the outer surface need not be perfectly cylindrical with a circular cross-section.

FIG. 2 shows another embodiment of frequency adapter to which the method in accordance with the invention can be applied.

The figure shows two assemblies each comprising an inner armature 1, an elastomer ring 2 and a cylindrical ring 3. The two assemblies are aligned and surrounded by a single outer sheath 7. In this example one of the two parts to be joined to the adapter is fixed to the inner armature 1 of one of the components by an attachment 8 and the other to the inner armature of the other component by an attachment 8 and the outer sheath 7 is used only to join the two assemblies together. As in the previous example, when each assembly has cooled after molding the elastomer the assemblies are inserted into the outer sheath 7 and the operation to reduce the diameter is then carried out. Adapters of this kind can be used, for example, as frequency adapters for helicopters rotors in which case they are disposed either between each blade and the rotor or between two consecutive blades. The invention is not restricted to this application, however, but can be applied to any cylindrical type frequency adapter.

There is claimed:

1. Method of manufacturing a cylindrical type frequency adapter comprising:

molding under heat and pressure at least one assembly of an elastomer ring molded between an inner armature and a radially outer cylindrical ring such that said elastomer ring adheres to said armature and to said cylindrical ring, and after said elastomer ring is molded between said inner armature and said radially outer cylindrical ring, cooling the resulting assembly without carrying out any diameter reducing operations, and then sleeving said assembly into a cylindrical outer sheath, and reducing the diameter of the complete adapter by plastic deformation of said cylindrical outer sheath and also simultaneously reducing the diameter of said cylindrical ring such that deformation of the cylindrical ring is by elastic deformation and its diameter is maintained by the outer cylindrical sheath thereby releasing stresses in the elastomer ring, simultaneously the outer cylindrical sheath is clamped onto the assembly comprised of the outer cylindrical ring, the elastomer ring and the inner armature and thereby avoiding the need to subsequently machine the assembly.

* * * * *